(12) United States Patent
Muir

(10) Patent No.: US 10,399,296 B2
(45) Date of Patent: Sep. 3, 2019

(54) METHOD OF MANUFACTURING A STRUCTURAL PANEL FOR AN ENGINEERING STRUCTURE

(71) Applicant: Daniel Jefferson Muir, Pershore (GB)

(72) Inventor: Daniel Jefferson Muir, Pershore (GB)

(*) Notice: Subject to any disclaimer, the term of this patent is extended or adjusted under 35 U.S.C. 154(b) by 128 days.

(21) Appl. No.: 15/328,644

(22) PCT Filed: Jul. 22, 2015

(86) PCT No.: PCT/GB2015/052108
§ 371 (c)(1),
(2) Date: Jan. 24, 2017

(87) PCT Pub. No.: WO2016/012779
PCT Pub. Date: Jan. 28, 2016

(65) Prior Publication Data
US 2017/0225428 A1 Aug. 10, 2017

(30) Foreign Application Priority Data

Jul. 25, 2014 (GB) .................................. 1413243.5

(51) Int. Cl.
*B32B 37/00* (2006.01)
*B32B 5/18* (2006.01)
(Continued)

(52) U.S. Cl.
CPC ............... *B32B 5/18* (2013.01); *B29C 63/02* (2013.01); *B32B 5/02* (2013.01); *B32B 5/145* (2013.01);
(Continued)

(58) Field of Classification Search
CPC .......... B32B 5/02; B32B 5/145; B32B 5/147; B32B 5/18; B32B 5/22; B32B 5/245;
(Continued)

(56) References Cited

U.S. PATENT DOCUMENTS 3,823,047 A * 7/1974 Colombo ................ B29C 67/20
156/309.9
5,047,114 A 9/1991 Frisch et al.
(Continued)

FOREIGN PATENT DOCUMENTS

EP    1 561 568    8/2005
GB    1 062 670    3/1967
(Continued)

OTHER PUBLICATIONS

International Search Report and Written Opinion of the International Searching Authority for PCT/GB2015/052108 dated Dec. 7, 2015, 14 pages.

(Continued)

*Primary Examiner* — James D Sells
(74) *Attorney, Agent, or Firm* — Nixon & Vanderhye P.C.

(57) ABSTRACT

A method of manufacturing at least one structural panel (20) for an engineering structure comprises conveying a layered structure (40) through a roller assembly comprising at least one pair of heating rollers (50) and at least one pair of cooling rollers (52), where the cooling rollers are at a lower temperature than the heating rollers. The layer structure comprises a thermoplastic foam layer 24 and at least one skin layer (22). The heating rollers 0 heat the skin layer (22) to melt at least part of the foam layer (24) adjacent to the skin layer (22) and bond the foam layer (24) to the skin (22). The cooling rollers (52) cool the layered structure (40) so that the thermoplastic resolidifies, retaining its bond with the skin to form the bonded panel (20). This approach greatly reduces manufacturing costs for structural panels.

19 Claims, 7 Drawing Sheets

(51) Int. Cl.

| | |
|---|---|
| B32B 37/06 | (2006.01) |
| B29C 63/02 | (2006.01) |
| B32B 5/02 | (2006.01) |
| B32B 5/14 | (2006.01) |
| B32B 5/22 | (2006.01) |
| B32B 5/24 | (2006.01) |
| B32B 5/26 | (2006.01) |
| B32B 15/04 | (2006.01) |
| B32B 15/14 | (2006.01) |
| B32B 15/18 | (2006.01) |
| B32B 15/20 | (2006.01) |
| B32B 21/04 | (2006.01) |
| B32B 21/10 | (2006.01) |
| B32B 27/06 | (2006.01) |
| B32B 27/12 | (2006.01) |
| B32B 27/16 | (2006.01) |
| B32B 27/18 | (2006.01) |
| B32B 27/28 | (2006.01) |
| B32B 27/36 | (2006.01) |
| B32B 27/38 | (2006.01) |
| B32B 27/40 | (2006.01) |
| B32B 27/42 | (2006.01) |
| B32B 37/08 | (2006.01) |
| B62D 29/04 | (2006.01) |
| B29L 31/60 | (2006.01) |

(52) U.S. Cl.
CPC ............... *B32B 5/147* (2013.01); *B32B 5/22* (2013.01); *B32B 5/245* (2013.01); *B32B 5/26* (2013.01); *B32B 15/046* (2013.01); *B32B 15/14* (2013.01); *B32B 15/18* (2013.01); *B32B 15/20* (2013.01); *B32B 21/047* (2013.01); *B32B 21/10* (2013.01); *B32B 27/065* (2013.01); *B32B 27/12* (2013.01); *B32B 27/16* (2013.01); *B32B 27/18* (2013.01); *B32B 27/28* (2013.01); *B32B 27/281* (2013.01); *B32B 27/36* (2013.01); *B32B 27/38* (2013.01); *B32B 27/40* (2013.01); *B32B 27/42* (2013.01); *B32B 37/0053* (2013.01); *B32B 37/06* (2013.01); *B32B 37/08* (2013.01); *B62D 29/04* (2013.01); *B29L 2031/608* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2266/02* (2013.01); *B32B 2266/025* (2013.01); *B32B 2266/0214* (2013.01); *B32B 2266/0235* (2013.01); *B32B 2266/0257* (2013.01); *B32B 2266/0264* (2013.01); *B32B 2305/022* (2013.01); *B32B 2307/102* (2013.01); *B32B 2307/304* (2013.01); *B32B 2307/542* (2013.01); *B32B 2307/56* (2013.01); *B32B 2307/72* (2013.01); *B32B 2309/02* (2013.01); *B32B 2311/00* (2013.01); *B32B 2317/16* (2013.01); *B32B 2398/20* (2013.01); *B32B 2419/00* (2013.01); *B32B 2457/00* (2013.01); *B32B 2605/00* (2013.01); *B32B 2605/18* (2013.01); *B32B 2607/00* (2013.01)

(58) Field of Classification Search
CPC ......... B32B 5/26; B32B 15/046; B32B 15/14; B32B 15/18; B32B 15/20
USPC ........................................... 156/498
See application file for complete search history.

(56) References Cited

U.S. PATENT DOCUMENTS 8,517,080 B2 * 8/2013 Fujishima ........... B32B 37/0053
156/555
2009/0277567 A1 11/2009 Chang

FOREIGN PATENT DOCUMENTS

| GB | 1 385 716 | 2/1975 |
|---|---|---|
| GB | 1 505 299 | 3/1978 |
| GB | 1 482 890 | 8/1987 |
| KR | 10-2000-0000207 | 1/2000 |
| WO | WO 99/10220 | 3/1999 |

OTHER PUBLICATIONS

Search Report for GB1413243.5 dated Jan. 26, 2015, 4 pages.

* cited by examiner

| Construction | Pressed Aluminium | CF/Epoxy Composite 142GPa [0/45/-45/90/-45/45/0] 10 | CF/Epoxy Composite 240GPa [0/45/-45/90/-45/45/0] 10 | d3 Al-PET-Al 0.5mm skins 65kg/m3 Core Density 20 | d3 Al-PET-Al 0.4mm skins 65kg/m3 Core Density 20 |
|---|---|---|---|---|---|
| Cross Section form | ~~~ | ~~~ | ~~~ | ▬ | ▬ |
| Gauge (mm) | 1.5 | 1.1 | 1.1 | 10.0 | 5.0 |
| Total package depth including stiffening ribs (mm) | 10.0 | 10.0 | 10.0 | 10.0 | 5.0 |
| Areal mass (kg/m2) | 4.05 | 1.72 | 1.71 | 3.30 | 2.46 |
| Flexural Rigidity (Nm2) | 847 | 416 | 693 | 1933 | 409 |
| Flexural rigidity per areal mass | 209 | 242 | 405 | 586 | 166 |
| 1st bending mode frequency (Hz) | 68 | 63 | 84 | 310 | 208 |
| 2nd bending mode frequency (Hz) | 98 | 78 | 100 | 481 | 241 |
| NVH tuning method | Geometry or Damping pads | Geometry, damping pads or core | Geometry, damping pads or core | Core density change or via process parameters (no retooling necessary) | Core density change or via process parameters (no retooling necessary) |
| Thermal conductivity 'K' Value(s) (W/m.K) | 140 | TBD | TBD | Skins 140 Core 0.033 | Skins 140 Core 0.033 |
| Insulation 'R' Value total (m2K/W) | 0.011 | TBD | TBD | 303.0 | 151.5 |
| Thermal Mass/m2, Total (J/kg.K.m2) | 3888 | TBD | TBD | 1245 | 2074 |
| Thermal Mass/m2, Cabin side (J/kg.K.m2) | 3888 | TBD | TBD | 622 | 1036 |
| Recyclable | Y | N | N | Y | Y |
| Cost Factor | 1 | 8 | 30 | 2 | 2 |

FIG. 11

METHOD OF MANUFACTURING A STRUCTURAL PANEL FOR AN ENGINEERING STRUCTURE

This application is the U.S. national phase of International Application No. PCT/GB2015/052108 filed Jul. 22, 2015 which designated the U.S. and claims priority to GB Patent Application No. 1413243.5 filed Jul. 25, 2014, the entire contents of each of which are hereby incorporated by reference.

The present technique relates to a method of manufacturing a structural panel for an engineering structure.

Structural panels made of composite materials are useful for a wide variety of engineering structures, such vehicles or buildings. It is known that the strength and stiffness of a composite structure can be increased significantly with little additional weight by laminating a core material between skin layers. This creates a structural panel known as a "sandwich panel". The core of the sandwich panel serves to distribute shear stresses from loads over wider area and resist shear and compressive forces better than a single faced laminate. However, such structural panels are typically expensive to manufacture and so this limits the fields in which the panels can be used. The present technique seeks to provide a cheaper method of manufacturing at least one structural panel for an engineering structure.

Viewed from one aspect, the present technique provides a method of manufacturing at least one structural panel for an engineering structure; the method comprising:

conveying a layered structure through a roller assembly comprising at least one pair of heating rollers and at least one pair of cooling rollers, wherein the cooling rollers are at a lower temperature than the heating rollers, the layered structure comprising a thermoplastic foam layer and at least one skin layer;

heating the skin layer and applying a bonding pressure to the layered structure using said at least one pair of heating rollers, to melt at least part of the thermoplastic foam layer adjacent to the skin layer to bond the thermoplastic foam layer to the skin layer; and cooling the layered structure using said at least one pair of cooling rollers.

Most current structural panels for engineering structures are manufactured by glueing the skin layers to the core using an adhesive. The adhesive is expensive and typically requires curing at high temperature for a relatively long time which increases process time and energy costs, reduces throughput and hence greatly increases the cost of manufacturing such pieces. Also, the adhesive is typically non-recyclable and so in order to recycle panels it would be necessary to burn off the adhesive which creates further barriers to recycling these materials.

The inventor of the present technique recognised that these problems can be addressed by manufacturing the structural panel in a different manner, to eliminate the need for an adhesive. A layered structure comprises a thermoplastic foam layer and at least one skin layer. The skin layer can be provided on one or both sides of the thermoplastic foam layer. The layered structure is conveyed through a roller assembly which has at least one pair of heating rollers and at least one pair of cooling rollers. The heating rollers heat the skin layer and apply a bonding pressure to the layered structure to melt at least part of the thermoplastic foam layer adjacent to the skin layer. The molten part of the foam layer acts as an adhesive to bond the thermoplastic foam layer to the skin layer. The cooling rollers then cool the layered structure so that the thermoplastic solidifies, retaining its bond with the skin layer.

This approach greatly saves costs since there is no need to provide an adhesive or a curing process and the processing time is greatly reduced. This results in substantively reduced manufacturing costs, opening up markets for the structural panel for which the cost would have been prohibitive with existing processes. Also, the use of a thermoplastic foam layer provides improved properties for the structural panel compared to other cores such as aluminium honeycomb structures. The thermoplastic foam core provides improved energy absorption, fatigue resistance and noise proofing. This is a significant advantage, since with typical existing structural panels it is necessary to add additional damping material to the panels to provide sufficient noise insulation, which adds weight to the panel. In contrast, with the present technique the foam layer provides sufficient damping without the need for extra weight, resulting in a lighter panel. As well as acoustic insulation, the panel also provides thermal insulation, and reduced thermal mass which is very useful when the panel is to be used in an application for which heat dissipation is important.

Also, the inventor realised that the use of heating rollers to bond the thermoplastic foam layer to the skin layer, and cooling rollers to cool the bonded structure, produces reduced warping of the structural panel compared to an alternative technique in which a heated platen is pressed down onto the layered structure to heat the skin layer. With the heated platen, any heat differential across the platen causes differential expansion of the panel, which leads to buckling, and also it is difficult to heat and cool the platen fast enough to prevent the entire foam layer overheating, melting and collapsing. In contrast, with the roller approach, inline heating is carried out over a linear portion of the panel, so that heat can flow away from the roller so that expansion and contraction of the panel does not lead to distortion, and also the motion of the structural panel through the roller assembly can ensure that the heating and cooling is fast enough to avoid collapse of the foam layer.

The skin layer may be made of various materials, examples of which are described below.

In one embodiment, the skin layer comprises a metal. In this specification the term 'metal' includes a pure metal, an alloy of pure metals (containing no non-metals), and a metal alloy containing carbon impurities, such as a steel. In one embodiment, the metal is a pure metal. In another embodiment, the metal is an alloy of pure metals containing no non-metals. In a further embodiment, the metal is a metal alloy containing carbon impurities. Examples of suitable metals include alkaline earth metals such as magnesium; p-block metals such as aluminium, indium, tin, lead and bismuth; transition metals such as zinc, molybdenum, cadmium, scandium, titanium, vanadium, chromium, manganese, iron, cobalt, nickel, copper, yttrium, zirconium, niobium, ruthenium, rhodium, palladium, silver, hafnium, tantalum, tungsten, rhenium, osmium, iridium, platinum and gold; lanthanoids such as lanthanum, cerium, praseodymium, neodymium, promethium, samarium, europium, gadolinium, terbium, dysprosium, holmium, erbium, thulium, ytterbium and lutetium; and alloys of any thereof. In one embodiment, the metal is selected from aluminium, magnesium, titanium or copper.

In another embodiment, the metal is an alloy. In one embodiment, the alloy is an aluminium alloy, i.e. an alloy in which aluminium is the predominant metal (i.e. more than 50%, such as more than 60%, such as more than 70%, such as more than 75%, such as more than 80%, such as more than 85%, such as more than 90%, such as more than 95%, such as more than 97%, such as more than 99%, by weight of the total weight of the alloy is aluminium). The typical alloying elements are copper, magnesium, manganese, iron, titanium, chromium, silicon and zinc. In one embodiment, the alloying element is present in an amount by weight of less than 10%, such as less than 7%, such as less than 5%, such as less than 3%, such as less than 2%, such as less than 1%, such as less than 0.5%, such as less than 0.2%, such as less than 0.1% (as a percentage of the total weight of the alloy).

In one embodiment, the aluminium alloy is alloy 5251. This alloy has the following composition (each percentage by weight of the total weight of the alloy): magnesium 1.70-2.40%; manganese 0.10-0.50%; iron 0-0.50%; silicon 0-0.40%; titanium 0-0.15%; chromium 0-0.15%; copper 0-0.15%; zinc 0-0.15%; other metals (each) 0-0.05%, the total of other metals being 0-0.15%; and the remainder aluminium.

In one embodiment, the aluminium alloy is alloy 5754. This alloy has the following composition (each percentage by weight of the total weight of the alloy): silicon 0-0.40%; iron 0-0.40%; copper 0-0.15%; manganese 0-0.50%; magnesium 2.60-3.60%; chromium 0-0.3%; titanium 0-0.15%; zinc 0-0.2%; other metals (each) 0-0.05, the total of other metals being 0-0.15%; and the remainder aluminium.

In one embodiment, the aluminium alloy is alloy 3105. This alloy has the following composition (each percentage by weight of the total weight of the alloy): magnesium 0.5%; manganese 0.5%; and the remainder aluminium.

In one embodiment, the aluminium alloy is alloy 6111. This alloy has the following composition (each percentage by weight of the total weight of the alloy): silicon 0.6-1.1%; iron 0.40%; copper 0.5-0.9%; manganese 0.1-0.45%; magnesium 0.5-1.0%; chromium 0.1%; titanium 0.1%; zinc 0.15%; and the remainder aluminium.

In one embodiment, the aluminium alloy is alloy 6181A. This alloy has the following composition (each percentage by weight of the total weight of the alloy): magnesium 0.5-1.1% (typically 0.65-0.95%); silicon 0.6-1.2% (typically 0.75-1.05%); and the remainder aluminium.

In one embodiment, the aluminium alloy is alloy 6016. This alloy has the following composition (each percentage by weight of the total weight of the alloy): magnesium 0.25-0.65%; silicon 0.95-1.5%; and the remainder aluminium.

In one embodiment, the aluminium alloy is alloy AC-120/AC-121 (trademark of Novelis). This alloy has the following composition (each percentage by weight of the total weight of the alloy): magnesium 0.4%; silicon 1.1%; and the remainder aluminium.

In one embodiment, the aluminium alloy is alloy AC-140 (trademark of Novelis). This alloy has the following composition (each percentage by weight of the total weight of the alloy): magnesium 0.5%; silicon 1.2%; and the remainder aluminium.

In one embodiment, the aluminium alloy is alloy AC-122 (trademark of Novelis). This alloy has the following composition (each percentage by weight of the total weight of the alloy): magnesium 0.6%; silicon 1.3%; and the remainder aluminium.

In one embodiment, the alloy is a steel. The steel may contain more than 50%, such as more than 60%, such as more than 70%, such as more than 75%, such as more than 80%, such as more than 85%, such as more than 90%, such as more than 95%, such as more than 97%, such as more than 99%, by weight of iron (as a percentage of the total weight of the alloy). The carbon content of steel is typically 0.001% to 5%, such as 0.002% to 2.5%, such as 0.01% to 1%, such as 0.05 to 0.5% by weight (of the total weight of the steel). In one embodiment, the carbon content of steel is 0.002% to 2.1% of the total weight of the steel. Common alloying elements include manganese, nickel, chromium, molybdenum, boron, titanium, vanadium, and niobium. In one embodiment, the alloying element is present in an amount by weight of less than 10%, such as less than 7%, such as less than 5%, such as less than 3%, such as less than 2%, such as less than 1%, such as less than 0.5%, such as less than 0.2%, such as less than 0.1%, of the total weight of the steel. Examples of suitable steels include stainless steel (defined as a steel alloy containing iron and chromium with a minimum of 10.5% to 11% chromium content by weight of the total weight of the steel).

In one embodiment, the skin layer comprises a lignocellulosic material, such as wood. Wood is a natural composite of cellulose fibres embedded in a matrix of lignin which resists compression. Examples of woods include softwoods (i.e. woods from coniferous trees) such as fir, cedar, pine, spruce and yew; and hardwoods (i.e. woods from broad-leaved trees) such as ash, aspen, balsa, birch, cherry, elm, hazel, linden, lime, basswood, mahogany, maple, oak, teak and walnut.

In one embodiment, the skin layer comprises a composite material. In this specification the term "composite material" in its broadest sense means a material made from two or more constituent materials with different physical or chemical properties, that when combined, produce a material with characteristics different from the individual components.

In one embodiment, the composite material is a fibre-reinforced polymer. A fibre-reinforced polymer is a composite material comprising a polymer matrix reinforced with fibres. Examples of polymer matrices used in fibre-reinforced polymers include polyester resins (such as those defined and exemplified below in relation to thermoplastics), epoxy resins (such as bisphenol A epoxy resin, bisphenol F epoxy resin, novolac epoxy resins, glycidyl epoxy resins, and glycidylamine epoxy resins), and vinyl ester resins (defined as a resin produced by the esterification of an epoxy resin with an unsaturated monocarboxylic acid). Examples of fibre materials include glass fibres, carbon fibres and aramid fibres.

In another embodiment, the skin layer comprises a polymer. The polymer may be a thermoplastic polymer or a thermosetting polymer. Examples of thermoplastics include those defined and exemplified below with relation to the foam layer. Examples of thermosetting polymers include polyester resins; polyurethanes; phenol-formaldehyde resins; urea-formaldehyde resins; melamine resins; epoxy resins; polyimides; cyanate esters; and polycyanurates. When the skin layer and the form layer both comprise thermoplastic polymers, the thermoplastic polymers may be the same or different, but are preferably different.

It is also within the scope of the present invention that the skin layer may comprise a number of sub-layers having different chemical compositions (particularly different metals or different alloys thereof, especially different aluminium alloys). In one embodiment, the skin layer comprises one sub-layer (the inner skin) adjacent to the core layer, and another sub-layer (the outer skin) on the outside of the structural panel. When the skin layer is a metal or alloy, this embodiment can typically be formed from a multi-layer ingot of the metal or alloy, which is rolled as described above in order to bond the skin layer to the foam layer.

The present technique is particularly useful when the skin layer comprises aluminium or aluminium alloy. Aluminium-based structural panels are very useful for a wide range of engineering applications since aluminium is lightweight and cheaper than carbon fibre.

The thermoplastic used for the foam layer may be any thermoplastic. In one embodiment, the thermoplastic has a melt temperature which is less than the skin degradation temperature of the skin layer. The skin degradation temperature is the temperature at which the skin layer deforms or becomes unusable. Hence, the heating rollers may be hot enough to heat the skin layer above the melt temperature of the thermoplastic foam layer but not so hot that the temperature of the skin layer exceeds the skin degradation temperature.

In one embodiment, the thermoplastic is a thermoplastic organic polymer. A large number of thermoplastic organic polymers are known in the art. Examples of particular classes of thermoplastic organic polymers suitable for use according to the present technology include polyolefins, substituted polyolefins, polyesters, polyamides, polyimides, and mixtures or derivatives thereof.

In one embodiment, the thermoplastic organic polymer is a polymer formed by polymerising an ethylenically unsaturated monomer (i.e. a compound having a C═C bond). In one embodiment, the ethylenically unsaturated monomer may be an olefin: in other words, an unsubstituted, unsaturated hydrocarbon (such as ethylene, propylene, 1-butene or styrene). In this specification polymers formed by polymerising such monomers are termed 'polyolefins'. In another embodiment, the ethylenically unsaturated monomer is an ethylenically unsaturated hydrocarbon substituted with a halogen atom (such as vinyl chloride, vinylidene dichloride or tetrafluoroethylene), or an ethylenically unsaturated hydrocarbon substituted with another substituent (such as a carboxylic acid or carboxylic ester group, such as a methoxycarbonyl or ethoxycarbonyl group) In this specification polymers formed by polymerising such monomers are termed 'substituted polyolefins'.

Examples of suitable polyolefins include, but are not limited to: polyethylenes; polypropylenes; poly(1-butene); poly(1-pentene); poly(1-hexene); poly(methyl pentene); polystyrene; cycloolefin homopolymer or copolymers; and mixtures thereof. Examples of suitable substituted polyolefins include, but are not limited to: poly(vinyl chloride); poly(vinylidene chloride); poly(vinylidene fluoride); poly(tetrafluoroethylene) (PTFE, Teflon®); poly(methyl methacrylate); and mixtures thereof.

In one embodiment, the polyolefin is polyethylene. Polyethylene is typically characterised by its density and linearity. Very low density polyethylene (VLDPE), low density polyethylene (LDPE), linear low density polyethylene (LLDPE), medium density polyethylene (MDPE) and high density polyethylene (HDPE) and ultra high molecular weight polyethylene (UHMWPE) may all be used in the present invention. UHMWPE is polyethylene with a molecular weight numbering in the millions, usually between 3.1 and 5.67 million. It typically has a density of 0.930-0.935 g/cm³. HDPE is defined by a density of greater or equal to 0.941 g/cm³. MDPE is defined by a density range of 0.926-0.940 g/cm³. LLDPE is defined by a density range of 0.915-0.925 g/cm³. LLDPE is a substantially linear polymer with significant numbers of short branches, commonly made by copolymerization of ethylene with short-chain alpha-olefins (for example, 1-butene, 1-hexene and 1-octene). LDPE is defined by a density range of 0.910-0.940 g/cm³. VLDPE is defined by a density range of 0.880-0.915 g/cm³. VLDPE is a substantially linear polymer with high levels of short-chain branches, commonly made by copolymerization of ethylene with short-chain alpha-olefins (for example, 1-butene, 1-hexene and 1-octene). All of the above forms of polyethylene can be prepared by standard techniques well known to those skilled in the art.

In one embodiment, the polyolefin is polypropylene. The polypropylene may be stereoregular (isotactic or syndiotactic), atactic polypropylene, or a mixture thereof. Stereoregular polypropylene, as well as other poly(l-alkenes), can be isotactic or syndiotactic depending on the relative orientation of the alkyl groups in the polymer chains. Stereoregular polypropylene chains are illustrated below (isotactic above syndiotactic):

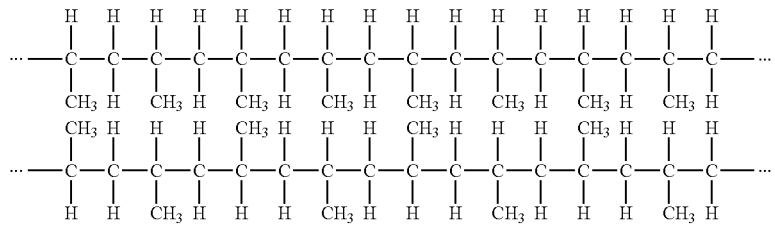

In isotactic polypropylene, all stereogenic centres CHCH₃ share the same configuration. The stereogenic centres in syndiotactic polypropylene alternate their relative configuration. A polypropylene that lacks any regular arrangement in the position of its methyl substituents is called atactic. Both isotactic and syndiotactic polypropylene are crystalline, whereas atactic polypropylene is amorphous. All of the above forms of polypropylene can be prepared by standard techniques well known to those skilled in the art. Suitably, the polypropylene is isotactic polypropylene or syndiotactic polypropylene.

In one embodiment, the thermoplastic organic polymer is a polyester. A polyester is defined as a polymer which contains an ester functional group in the main chain. Examples of polyesters include polyethylene terephthalate (PET), polybutylene terephthalate (PBT), polytrimethylene terephthalate (PTT), polybutylene succinate (PBS), polyethylene adipate (PEA) polyethylene naphthalate (PEN), polyglycolic acid (PGA), polylactic acid (PLA), polycaprolactone (PCL), or a polyhydroxyalkanoate (PHA) such as polyhydroxybutyrate, polyhydroxyvalerate or poly(3-hydroxybutyrate-co-3-hydroxyvalerate), and mixtures of any thereof. Particularly preferred examples include PET, PBT and mixtures of any thereof.

In one embodiment, the thermoplastic organic polymer is a polyamide. A polyamide is defined as a polymer which contains an amide functional group in the main chain.

Examples of polyamides include nylon-6,6; nylon-6 (polycaprolactam); nylon-6,9; nylon-6,10; nylon-6,12; nylon-11; nylon-12; polyamide 6T (obtained by polycondensation of hexamethylenediamine and terephthalic acid); aramides (such as those obtained by polycondensation of paraphenylenediamine and terephthalic acid); and mixtures of any thereof.

Other possible classes of thermoplastic polymers include polyetherimide (PEI), polyether ether ketone (PEEK) and polyether sulfone (PES).

In preferred embodiments, the thermoplastic may be at least one of: polyethylene terephthalate (PET), polybutylene terephthalate (PBT), polyetherimide (PEI), polypropylene (PP), polyamide (Nylon) or polyvinyl chloride (PVC).

It is possible to use the present technique to make a structural panel in which only one side of the thermoplastic foam layer is laminated with a skin layer. In this case, the heating and cooling may be applied only on one side of the foam core by the rollers. Nevertheless, pairs of rollers may be provided to provide sufficient bonding pressure.

However, the present technique is particularly useful for generating a sandwich panel in which a pair of skin layers are provided, one on each side of the thermoplastic foam layer, which provides a strong lightweight panel that is useful for a range of engineering applications. In this case, the heating rollers may heat both skin layers simultaneously to bond the outer edges of the thermoplastic foam layer to the skin layers.

In some cases, the layered structure which is passed into the roller assembly may be pre-assembled prior to manufacturing with the skin layer and thermoplastic foam loosely laid over one another. In other cases, the manufacturing method may also include a step of forming the layered structure by layering the respective foam and skin layers. This may be done at room temperature or ambient temperature. There is no need to perform any pre-heating of the skin layer or the thermoplastic foam prior to combining them to form the layered structure, since the heating rollers which bond the foam to the skin may provide sufficient heat for bonding. That is, the skin layers and thermoplastic foam layer may remain unheated until the point where they arrive at the heating rollers for bonding. The same heating rollers may both heat the skin layer(s) and apply the bonding pressure to the layered structure to bond the thermoplastic foam layer to the at least one skin layer. This simplifies the manufacturing equipment by avoiding the need for separate heating and pressing elements.

In some examples, the heating rollers may be heated by blowing hot air onto them and the cooling rollers may be heated by blowing cooler air onto them (e.g. the cooler air may be air at room temperature). In other cases the rollers may be heated by passing hot water or another liquid through them or by another method.

In some examples, the layered structure may be conveyed through the roller assembly on at least one belt which may be arranged over the rollers. This approach can be useful in implementations in which the rollers alone are not sufficient to convey the layered structure through the roller assembly. Where there are two skin layers on either side of the foam core, a double belt assembly may be used where the layered structure sits on one belt and another belt is laid on the top of the structure. The belt may be heated by the rollers or cooled by the rollers at the same time as the structure is heated or cooled and so this can provide further heating as the layered structure is being conveyed between pairs of rollers.

On the other hand, in other examples the belt may not be required. Instead, the layered structure may be supported directly by the rollers of the roller assembly and conveyed through the roller assembly by rotation of the rollers without using a belt. This can be useful because, by eliminating the belt, heating can be restricted to the rollers to reduce the likelihood of distortion of the panel due to two-dimensional temperature gradients across the surface of the belt.

The heating rollers may apply a bonding pressure to the sandwich structure. The cooling rollers may also apply a bonding pressure. Applying a little pressure using the roller may be useful for increasing the surface area of the skin layer and the foam core which are in contact with each other to improve the join. In practice, relatively little pressure is required. Rather than actively pressing the rollers together, it is possible to control the bonding pressure simply by adjusting a nip spacing between each pair of heating rollers or each pair of cooling rollers. In general, the narrower the nip spacing, the greater the pressure as the layered structure is forced between the rollers. To achieve a better join, it is useful to provide a series of pairs of heating rollers where the nip spacing between each pair narrows as the layered structure proceeds through the layered assembly.

In one embodiment, the surface topography of the structure may be formed using electric discharge texturing (EDT). This technique involves the use of texturized rolls to transfer the topography at the end of the rolling procedure. This process confers a number of advantages: it is isotropic, so there is no directional influence on the topography formation; the formation of lubrication pockets (leading to build up of hydrostatic pressure) mean there is a low and regular friction coefficient, leading to better formability and less pick-up of work piece material on the tool surface, and regular press parameters; and the stochastic surface structure provides a good lacquer appearance.

The depth and/or density of the molten part of the thermoplastic foam can be varied by changing at least one of the bonding pressure, the rate at which the layered structure is conveyed through the roller assembly (e.g. by adjusting the nip spacing), and the processing temperature). By changing the depth or density of the thermoplastic core, structural panels with different mechanical properties can be produced. In general, a thicker melt layer will give a higher impact resistance for impact normal to the panel, which can be useful when thin skins are required to achieve the required stiffness and light weight, but when those skins would be vulnerable to denting from localised points or impact loading (for example a panel used for a car floor where the floor is susceptible to damage from stones thrown up from the road or from interior damage from occupants wearing stiletto-heel shoes). For example, the nip spacing between the heating or cooling rollers could be decreased, or the feed rate through the roller assembly decreased, to provide a thicker melt layer which provides higher energy absorption properties. On the other hand, for other applications where sharp impacts in localised areas are less likely, a thinner melt layer could be produced.

The structural panel may also be produced with a variable density of the thermoplastic foam layer across the thickness of the foam layer, to give different mechanical properties. The variable density core may be generated in different ways. In one example, while the panel is cooling, the layer structure may be compressed to vary the density of the core. Hence, the initial bonding may produce a melt layer with a given density, but then further compression may generate an even denser layer on the outer side of the melt layer. This further compression may be performed using the cooling rollers for example, or with a further pair of rollers which may be heated at a lower temperature than the heating rollers to avoid melting the thermoplastic foam layer again.

Another way of varying the density across the foam core is to convey the layered structure through the roller assembly multiple times, with a different temperature or roller pressure applied on different passes through the roller assembly. For example the temperature of the heating rollers, the nip spacing between the heating or cooling rollers or other properties may be varied from pass to pass. For example, after a first pass where the assembly partially melts the foam core and bonds it to the skin, the rollers may then be closed further to compress the heated layer to increase its density locally and the result may be a core with greater density closer to the surface than in the middle. Further compressions or heating may be applied to make fine-grained adjustments to the density gradient of the foam core in response to changes in the heat input, the compression applied and the speed at which the material is passed through the assembly.

Another way of varying the density of the foam layer may be to provide a number of pre-laminated layers in the foam core which have different densities of the thermoplastic foam. This can be then be inserted into the roller assembly to bond the thermoplastic core to the skin using the method described above. In this case then no special variation in the bonding pressure or temperature is required, as the varying density results from the initial makeup of the core layer.

As well as varying the density of the thermoplastic foam layer across the thickness of the foam layer, it is also possible to provide different regions along the surface of the structural panel with different foam core densities. For example, after bonding, selected regions of the structural panel may be compressed and/or subjected to localised heating to increase the density of those regions compared to other regions. Once cooled this may create a denser, more solid, core area than other areas, which can be very useful for localised structural requirements such as attachment points or screw fixings. The panels could be locally indented prior to fusion bonding, with 'matching' indents in the foam, to provide local attachment points. The foam indent in these areas can be such that full consolidation is achieved locally. This method could provide local areas where the skins are bonded directly to one another using the fused core material.

The cooling rollers may form the bonded structural panel into a given shape, e.g. a curved shape, simply by shaping the panel as it cools without any additional heating. This would not typically be possible with conventional adhesively bonded structural panels, since the adhesive would have to be heated to be able to shape the panel. In some cases, the resulting panel may be shaped along the length of the panel (e.g. to perform a curved or bent structure). In other cases, the panel may be formed with a shaped, non-constant, cross-section across the width of the panel, for example using rollers with a shaped profile.

It is also possible to perform "hem flanging" of the structural panel, where the skins are fused together around the periphery (or part of the periphery), for instance using heated hem flanging rollers or a hem flanging anvil. For example, one of the skin layers and the core material may extend beyond the edge of the other skin layer, and the hem flanging tool may soften the extended portion of the core and bend the longer skin layer over the shorter skin layer to produce a hem flange at the edge of the panel. This can be useful for providing a sealed end of a panel.

A pre-treatment may be applied to the surface of the skin layer prior to bonding it to the foam core. For example, a metal layer such as aluminium may be anodised or subjected to plasma electrolytic oxidation (PEO), a titanium-zirconium-based pre-treatment, or other pre-treatments. Many such pre-treatments improve the bond between the core and the skin, both via chemical changes due to removing surface contaminants and raising the surface energy, and by altering the mechanical properties of the surface, for example increasing roughness and changing pore sizes in the surface layer to give a greater bond area and a greater surface key. Hence, not only is the fusion bonding approach of the present technique compatible with many known surface pre-treatments, such pre-treatments help to provide a better bond.

Similarly, the sandwich may be post-treated after the cooling step, for example to provide corrosion protection or a base for painting. For example, an electroplating ('E-Coat)' post-treatment may be applied, which may be cured at an elevated temperature of about 180° C., for example. While the thermoplastic foam layer may be raised above its thermoforming temperature during such post-processing, its thermoplastic chemistry allows it to regain its full mechanical properties when cooled again and so the post-treatment does not affect the mechanical properties of the structure panel.

As well as heating the layered structure to bond the skin to the cores, the heating rollers may in some cases also heat treat the skin layer to improve its properties. For example, heating an aluminium alloy skin may bake it into a harder temper to improve dent resistance and local buckling strength. This may be important for lightweight panels where the skins may be relatively thin. Alternatively this heat treatment could be applied in a subsequent procedure, or as part of a paint and/or adhesive cure cycle. This is particularly advantage where the sandwich skins are to be post formed, and therefore require a high formability during processing, but a higher 'in service' strength is required.

If greater strength is required, the layered structure may include a reinforcement layer. For example, a glass, carbon fibre or aramid mat layer may be included between the skin and the foam. During the heating step the molten part of the thermoplastic foam layer may infuse the reinforcement layer, to bond the skin to both the reinforcement layer and the thermoplastic foam.

In some cases the method may manufacture a single panel at a time from individually provided layered structures. In other cases a continuous layered structure may be fed in and when bonded may be cut into pieces to form multiple structural panels.

The panels manufactured using the present technique may be used for a wide range of engineering applications, such as automotive, aerospace, leisure, construction or electrical applications. For example, the panels may be used for the body of a car, aeroplane or other vehicles, a ship's hull, caravan or campervan bodies, the exterior of a building or other civil engineering construction, window frames, or casings for an electrical installation such as a transformer.

Viewed from another aspect, the present technique provides a structural panel manufactured according to the method discussed above.

Further aspects, features and advantages of the present technique will be apparent from the following description of examples, which is to be read in conjunction with the accompanying drawings, in which:

FIG. 1 schematically illustrates a known sandwich panel in which aluminium skins are glued to an aluminium honeycomb core using an adhesive;

FIG. 11 is a table showing the properties of two example sandwich panels 20 with different skin thicknesses.

Figure 1:
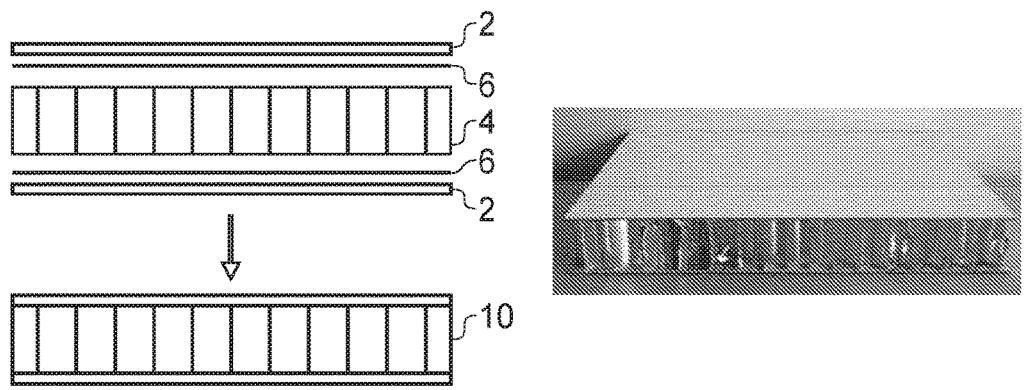

FIG. 1 shows a conventional structural panel for an engineering structure. The panel includes two aluminium skin layers 2 sandwiching an aluminium honeycomb structure 4. The honeycomb structure 4 includes internal barriers which trap pockets of air between the skin layers 2. The honeycomb structure 4 is glued to the skins 2 using an adhesive 6, such as an epoxy. The assembled structural panel 10 is lightweight and relatively strong for its weight, but for a number of reasons is not ideal. In use, the thin skins 2 tend to vibrate to cause noise. This is annoying for the occupant of a vehicle or building constructed with the panels. Noise proofing is particularly important in electric vehicles where there is no engine noise to hide the noise. In practice, to reduce noise the existing panel 10 is typically damped by adding heavy duty pads to the skin layers, which detracts from the lightweight benefit of using the panels in the first place. Also, the panels 10 are typically slow and expensive to produce because the adhesive 6 has a high cost and must be cured during manufacturing which requires a long processing time at which the adhesive is heated to around 120° C., resulting in increased energy costs. This is particularly significant as in the future environmental concerns may lead to the energy consumption and carbon emissions incurred during manufacture of products becoming a more significant factor in product design. The long processing time and high energy costs of this type of panel mean that typically it has been restricted for use in relatively high value fields such as marine and it has not generally been used in fields in which this cost is prohibitive, such as automotive. Also, the use of the adhesive 6 means that the panel 10 is not easily recyclable, which is a problem for the environment. To recycle the panel it would be necessary to burn off the adhesive layer 6, which would increase the cost and energy consumption of the recycling process making recycling of this panel less viable. Other alternative panels use pressed aluminium layers instead of the honeycomb structure, or may use carbon fibre or composite skins to reduce weight, but these have similar problems in that they are difficult to recycle and have high processing costs. Therefore, it is desirable to provide an improved structural panel for an engineering structure which can be manufactured more cheaply.

Figure 2:
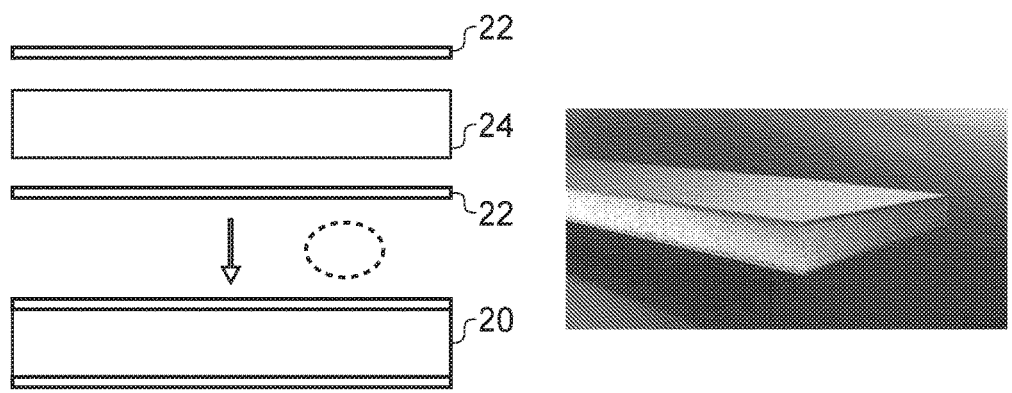
FIG. 2 illustrates a structural panel in which a thermoplastic foam core is bonded to skin layers by fusion bonding.

FIG. 2 shows an example of a structural panel 20 according to the present technique. The panel comprises a pair of skin layers 22 which sandwich a thermoplastic foam layer 24. The skin layers 22 may be made of any of the materials described and exemplified above; particularly preferred examples include a metal such as aluminium, titanium or magnesium; an alloy such as steel or aluminium alloy (such as those defined and exemplified above), carbon fibre, a composite material (such as a fibre-reinforced polymer) and wood. For many applications aluminium or aluminium alloy skin layers are useful because they are lightweight, relatively low cost and relatively strong.

It is also possible to use damped metal skins to improve the sound transmission loss properties of the structural panel 20. For example, each skin may be made of two metal layers (e.g. steel or aluminium) with a thin thermoplastic layer (e.g. polyethylene) laminated between the two metal layers. The thin plastic sandwich layer may be only a few microns thick, and can provide significant damping at higher frequency ranges (e.g. in the 300 Hz to 1500 Hz range). Examples of damped metal skins include Quiet Aluminum® or Quiet Steel® produced by Material Sciences Corporation. When damped metal skins are fusion bonded to a thermoplastic foam core as discussed below, this can provide significant damping across most frequency ranges.

The thermoplastic foam layer may for example be made from any of the thermoplastics defined and exemplified above, in particular a thermoplastic organic polymer such as a polyolefin, a substituted polyolefin, a polyester, a polyamide, a polyimides; particular examples include one or more of polyethylene terephthalate (PET), Polybutylene terephthalate (PBT), polyether imide (PEI), polypropylene (PP), a polyamide such as Nylon 6,6 or Nylon 6; or polyvinyl chloride (PVC). For example, PET may be used as it is relatively light, recyclable and cheap. Alternatively, for improved high temperature performance PEI could be used (for example this may be useful for aerospace applications). Typically, the thermoplastic foam layer may be any layer of thermoplastic which has a melt temperature which is lower than the temperature at which the skin layers degrade. By providing the thermoplastic as a foam (including pockets of air) rather than as a rigid thermoplastic layer, the process of manufacturing the panel 20 can be made cheaper and the acoustic, impact resistance and thermal properties of the panel can be improved.

The panel 20 may be manufactured by fusion bonding the skins 22 to the thermoplastic foam layer 24. As will be described in more detail below, the skins may be heated to a temperature above the melt temperature of the thermoplastic foam 24, so that the outer layer of the foam core is melted. The liquid foam then bonds to the skins 22. The panel is then cooled in a controlled manner and then the thermoplastic solidifies again and retains its bond with the skins 22. This means that the use of an adhesive 6 can be avoided, which greatly saves cost and energy consumption of the manufacture process. It has been found that it is possible to produce 1 to 3 meters of panel per minute using the new process, which is around a sixth of the time required to manufacture a corresponding amount of the honeycomb panel shown in FIG. 1.

Also, the panel 20 itself has improved properties compared to the existing panel 10 of FIG. 1. The use of the foam layer 20 provides improved thermal and acoustic insulation compared to the aluminium honeycomb core 4 in the known panel 10. The foam core provides damping and so no additional weight needs to be added to the panel in order to reduce the acoustic noise. The panel 20 has a much higher first bending mode frequency than typical panels, e.g. of the order of 310 Hz compared to 60-70 Hz for the panel 10 of FIG. 1 (this measurement was based on a panel whose size is typical for use as a car floor). In general, vibrations at frequencies lower than the frequency of the first bending mode of vibration will not induce noise, and so by greatly increasing the first bending mode frequency, the amount of noise can greatly be reduced. Also, the panel 20 has reduced thermal mass compared to the known panel 10. The thermal mass represents the amount of heat that can be stored by the panel. It is generally desirable to be able to reduce the thermal mass so that less cooling or air conditioning is required to cool the occupants of a vehicle or building constructed using a panel to a tolerable temperature. Also, the panel 20 of FIG. 2 is more impact and fatigue resistant than the panel FIG. 1. This is partially because the thermoplastic foam is able to absorb impact better than the aluminium honeycomb core 4, but also because the adhesive 6 used in the panel of FIG. 1 is itself prone to fatigue and by eliminating this adhesive this reduces the risk of fatigue in the panel.

Figure 4:
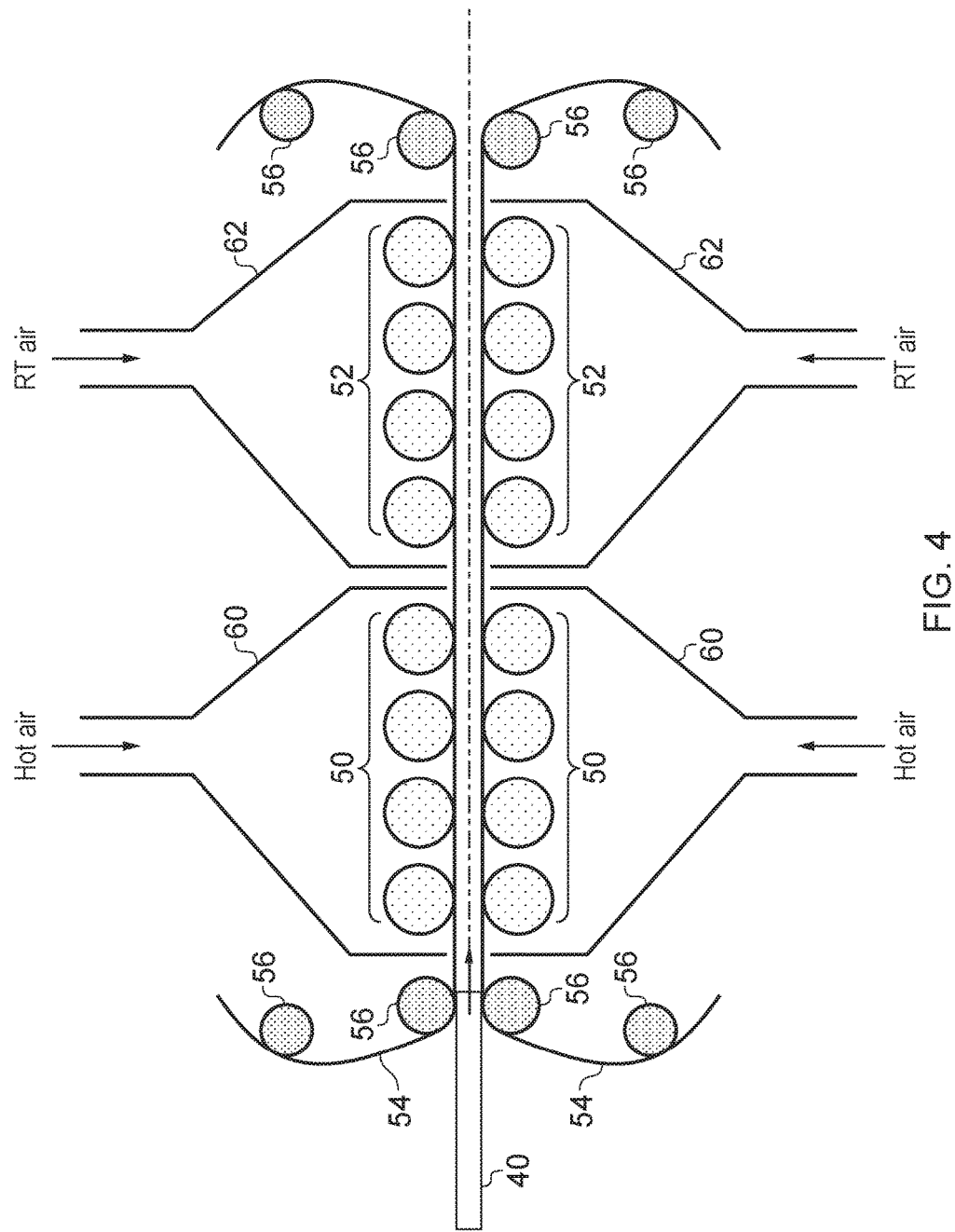
FIG. 4 shows an example process for manufacturing the structural panel.

FIG. 4 shows a first example of a process for manufacturing the sandwich panel 20. A sandwich structure 40 is formed by laying the thermoplastic core layer 24 over one of the skins 22 and laying the other skin 22 over the core 24. The sandwich structure 40 is unbonded and at ambient temperature at this point. The sandwich structure 40 is inserted into a roller assembly which includes one or more pairs of heated rollers 50 and one or more pairs of cooled rollers 52. The sandwich structure 40 is conveyed through the roller assembly by two belts 54 which are driven by traction rollers 56. The lower skin sits on a lower belt 54 and the upper belt rests on the upper skin. The heated rollers 50 are heated by blowing hot air into a region surrounded by containing walls 60 that contains the heated rollers. Similarly the cooled rollers 52 are cooled by blowing cool air into a region surrounded by containing walls 62. In this example the cool air is air at room temperature, which is cooler than the hot air used for the heating rollers. More generally, the cooled rollers 52 may be cooled to any temperature lower than the temperature of the heated rollers 50. Also, rather than using air blowers to heat or cool the rollers it is also possible to use other means of heating such as passing water or another liquid through the rollers (or electrical resistive or inductive heated rollers).

Hence, the sandwich structure 40 which starts off at ambient temperature is conveyed by the double belt press through the heated rollers so that the skins are heated, and this melts the outer layer on either side of the thermoplastic core. The rollers apply a little bonding pressure to increase the contact area of the rollers against the skins to improve heat transfer and bonding. The nip spacing between each pair of rollers decreases as the sandwich structure 40 is conveyed through the heated rollers 50. For example, the sandwich may enter the heated rollers with an 11 mm gap between the first pair of heated rollers but by the last pair of the heated rollers this may be reduced to 10 mm to provide extra compression. The cooled rollers 52 then cool the sandwich panel. The cooled rollers 52 may have a constant nip spacing of 10 mm for example. By cooling the outer skins, the molten outer layers of the foam core 24 resolidify to retain the bond with the skin material. The sandwich panel in then fed out from the roller assembly and is then fully cooled ready for use.

This process for manufacturing the sandwich panel 20 is very effective because the use of heated rollers 50 to heat the skins means that the process is an inline process in which heating is carried out over a linear region of the sandwich panel rather than over a two-dimensional area. With alternative approaches which use a heated plate pressed onto the panel to heat the core, there are several drawbacks when using thin flat skins because any small heat differential across the tool area causing local differential expansion across the skins which warps the panel. Also, any heat differential through the thickness of the skin (for example if one side is in contact with a hot tool and the other side of the skin is in contact with the foam at room temperature) would also lead to warping of the skins due to differential expansion. Also, the pressed plate would have to be heated and cooled at rates faster than is possible with conventional tooling because fast heating would be required so that the outer side of the foam is melted prior to the foam collapsing due to excessive heat and fast cooling is required to prevent over heating the foam so that a sufficiently crystalline structure in the thermoplastic melt later is formed. By using an inline process using heated rollers instead, these disadvantages can be avoided because while a linear region of the sandwich is being heated, heat can dissipate away from that linear region along the direction of travel of the sandwich and in the reverse direction. Since the heat and the cooling is effectively applied as a single strip across the panel, the expansion and contraction does not lead to distortion as was experienced with the pressed platen approach. Also, the motion of the layered structure 40 through the roller assembly achieves the fast heating and cooling without the need for special tooling to be heated and cooled quickly, since each roller may be held at a constant temperature.

FIG. 4 shows an example where the sandwich 40 is conveyed through the rollers by a double belt 54. In this approach, the belt 54 will itself be heated when passing through the hot air portion 60 of the roller assembly and cooled during the cool air portion 62. While this generally works, it has been found that occasionally there may be a small amount of warping caused by heating of the skins by the belt when the sandwich is being conveyed between rollers since the belt may retain some heat and there may be heat differentials across the surface of the belt.

Figure 5:
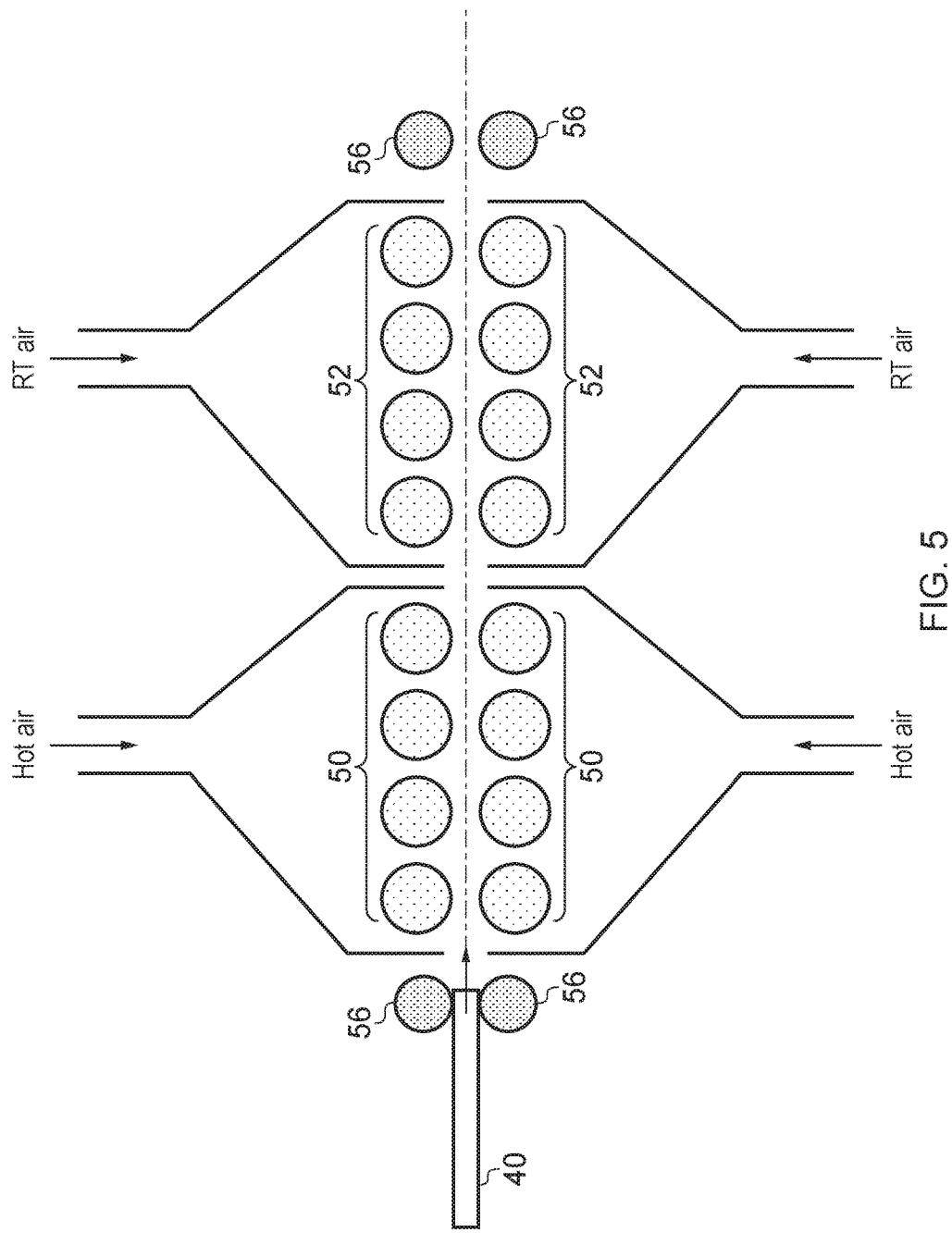
FIG. 5 shows a second example of the manufacturing process.

Therefore, in an alternative approach as shown in FIG. 5, the belts 54 may be eliminated, and instead the sandwich structure 40 may be supported directly by the rollers 50, 52, 56. Counterintuitively, this may give better results by avoiding heat gradients caused by the belt. The sandwich panel 40 is sufficiently rigid to retain its shape when passing between rollers so that the belt is not required. Other than removing the belt, the roller assembly may be the same as in FIG. 4 and the traction rollers 56 which drive the belt in FIG. 4 may instead drive the sandwich structure 40 (note the heat/cool rollers could also be driven in this option).

While FIGS. 4 and 5 show examples in which two skin layers are bonded to the thermoplastic core on either side using pairs of heated rollers, it is also possible to create a panel in which only one side of the thermoplastic core has a skin layer and the other side is bare. This may be useful for allowing further bonding of the thermoplastic side of the panel to other parts in a later stage of the manufacture. If only one skin is being bonded to the thermoplastic core, it may not be necessary to heat or cool the rollers on both sides of the sandwich.

In some cases, a single sandwich panel may be formed at a time by the process shown in FIGS. 4 and 5. However, for increased throughput it may be more convenient to bond a continuous sheet of panel and then cut the panel into pieces afterwards.

Figure 3:
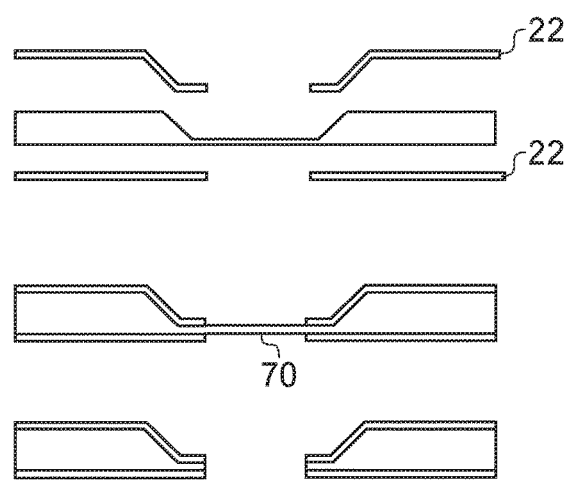
FIG. 3 shows an example of locally varying the density of the foam core.

After the sandwich panel has been formed and bonded, it is possible to perform further operations to shape the panel or vary its properties. For example, after forming the panel, a portion of the thermoplastic core may be compressed further for example by bringing down a compression tool. For example, this may be useful for providing attachment points or screw fixings or other localised structural requirements. As shown in FIG. 3, the region 70 in which the skin panels are pressed closer together may form a solid core area which can provide better support for fixings. The skins 22 in the region of the compressed area may have been pre-formed with holes in them for passing screws or bolts through them. Initial tests using sulphuric acid anodised (SAA) 2 mm aluminium skins and a locally consolidated core (2 mm foam fusion bonded to a 0.2 mm melt depth), bonded with a 20 mm overlap by 80 mm wide in a single shear configuration, have resulted in exceptionally high shear load capability of 10.6 kN.

Also, it is possible to form curved structures or other shapes of the panels by adding additional rollers or other shaping tools after the cooled roller section. For example, as the panel cools, bending the panel or allowing the panel to fall under gravity over a shaping edge can produce a curved structure. This is because the panel is fully thermoformable due to its thermoplastic foam layer without the need for additional heating. This is not possible with the panel of FIG. 1 since to form the panel 10 into different shapes it would be necessary to heat the epoxy adhesive 6 above its melting temperature again which would be much more expensive.

It is also possible to produce sandwich panels 20 with different densities of thermoplastic foam layer 24 or with thermoplastic foam layers which have a varying density across the thickness of the core.

For example, in some panels 20, the consolidated layer of the foam core, that is to melted to form the adhesive bond between the skin and the core, may be between 0.5 mm and 1 mm thick. Optionally, the thickness of this layer can be increased (by starting with a greater core thickness), to change the mechanical properties of the sandwich. A thicker melt layer will give a higher impact resistance for impacts normal to the panel, which can be particularly useful where only thin skins are required to achieve the required stiffness, but that would otherwise be vulnerable to denting from localised point or impact loading. An example would be the use as an automotive floor, where thin skins (and a thin melt layer) may provide the necessary panel static and modal stiffness, but be susceptible either exterior damage from stones thrown up from the road, or interior damage from occupants wearing stiletto heal shoes. In both instances a thicker melt layer could provide higher energy absorption properties, thereby preventing damage. It is feasible that the melt layer could be optimised to give different thickness for each skin, and/or different melt thicknesses across the panel via local changes to the skin or core geometries. The thickness of the melt layer may also be varied by changing the temperature of the heating rollers 50, the nip spacing between rollers 50, 52 or the feed rate at which the sandwich 40 is conveyed through the roller assembly.

Figure 6:
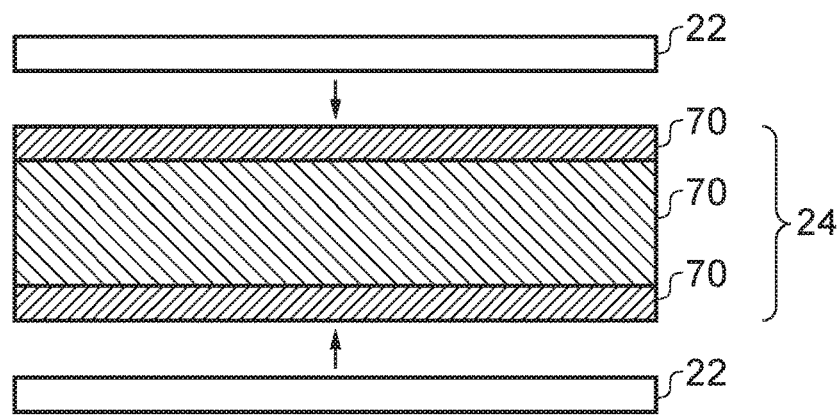
FIG. 6 shows an example of forming a structural panel from a thermoplastic core having a number of pre-laminated layers of different densities.
Figure 7:
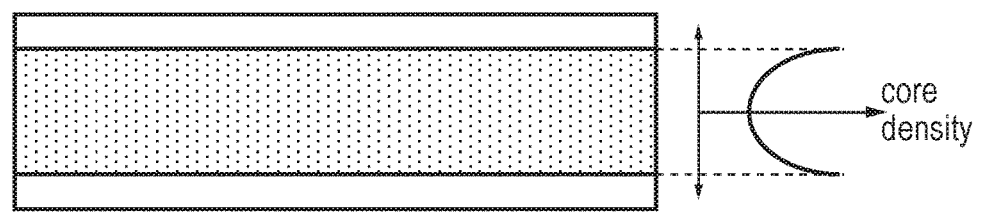
FIG. 7 shows a panel with a variable density core.

Mechanical properties can also be altered by varying the density of the core. This can be achieved by different methods. For example, as shown in FIG. 6, layers of core material 70 of different densities may be pre-laminated together to form the core 24 prior to fusion bonding the skins 22 in place. Typical foam core densities commercially available today (taking PET foam core as an example) range from 60 kg/m$^3$ to 200 kg/m$^3$, so for example a sandwich could be constructed with 1 mm skins fusion bonded to a core made up of a central 60 kg/m$^3$ core which has itself been pre-laminated with 150 kg/m$^3$ foam cores on both sides. Either an existing 'hot knife' process could be used to laminate the core foams to each other, or conventional adhesives. As shown in FIG. 7, this may result in a bonded panel 20 in which the core density varies across the thickness of the core, with a higher density at the edges of the core than in the middle for example.

Alternatively, a single density foam core may be thermoformed to have variable density via a controlled temperature and/or pressure profile. The core may be placed in a heated compression tool, or an inline set of heated rollers, which is at a temperature higher than the thermoforming temperature of the core, but lower than the melt temperature. Heat from the tool partially penetrates the foam core, until the penetrated layer is above thermoforming temperature of the core material. The tool is then closed further to compress the heated layer, thereby increasing its density locally. The result is a core with greater density closer to the surfaces than in the middle. The density gradient can be infinitely adjusted via process changes to the heat input and compression speed of the tool. This 'density thermoforming' could be carried out in the same tool (roller assembly) as that used to fusion bond the skins, either in a subsequent or parallel process. For example, the roller assembly may first raise the skins 22 to a temperature above the melt temperature of the foam core 24, and apply bonding pressure so that the skins are fusion bonded to the core (as in the process described with respect to FIGS. 4 and 5). The tool temperature may then be lowered below core melt temperature (but above thermoforming temperature of the core), whereby the skins are now fixed to the core via the fusion process. Once heat has raised the required depth of core above thermoforming temperature, the tool is then closed further to locally increase the density of the outer core layer. This may be done using a subsequent pass through the roller assembly or in the same pass as the bonding. Alternatively the process can be reversed to first thermoform the core to provide variable density, and then fusion bond the skins to the core at a higher temperature. In some cases, a further set of rollers subsequent to the cooled rollers may be used to thermoform the core.

By using different combinations of the above 'melt thickness' and 'density thermoforming' it is possible to achieve many different mechanical properties from the sandwich material, either using a single tool (preferably), or via subsequent process operations in different tools. It is also possible to achieve non-symmetric panel properties by using different temperature/pressure profiles on either side of the laminate.

Figure 8:
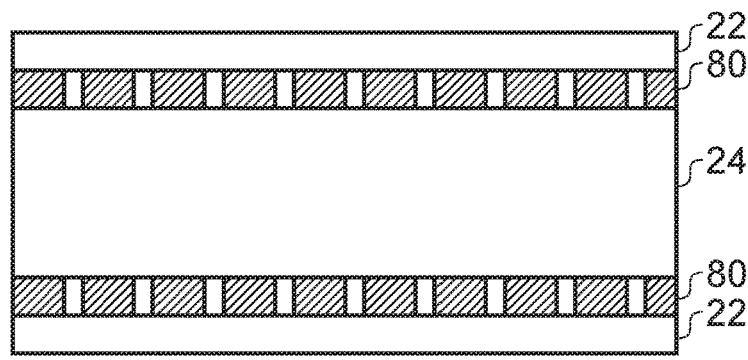
FIG. 8 shows an example of a structural panel including a reinforcement layer.

As shown in FIG. 8, another option for varying the mechanical properties of the completed laminate is to include an intermediate reinforcement layer 80 between the skins 22 and the core 24. The reinforcement layer 80 may for example be a glass, carbon fibre, aramid or reinforced composite layer (either with a thermoset or preferably a thermoplastic matrix) which is fusion bonded to the core 24 using the same process as described above. The reinforcement layer may be infused by the melt layer during the fusion process so that this also bonds the core 24 and reinforcement layer 80 to the skins 22. For example, a porous mat or mat with holes in may be used for the reinforcement layer 80 so that the melt layer can reach the skins 22.

The skin layers 22 may be subject to surface pre-treatment prior to processing. For example, aluminium could be treated with anodising, PEO, Ti—Zr or other pre-treatments. Initial surface pre-treatment tests have been shown to improve the fusion bond between the core and skins, via chemical changes (removing surface contaminants and raising the surface energy) and altering the mechanical properties of the surface (e.g. increasing roughness and changing pore sizes in the surface layer to give greater bond area and a greater surface 'key').

The fusion bonding process and materials can be selected to be compatible with existing finishing processes, in particular electro-coating (Ecoating) which is popular in the automotive industry for providing corrosion protection and a suitable primer for subsequent painting operations. An example would be to use a conventional Titanium Zirconium pre-treated aluminium skins on a PET foam core. This combination would be both compatible with epoxy adhesives for assembly (the adhesive being compatible with both skins and core), and a subsequent electro-coating operation (typically around 180° C. which bakes the adhesive and electro-coats in the same operation). Whilst the foam core will be raised above thermoforming temperature during this processing, its thermoplastic chemistry allows it to regain full mechanical properties once cooled.

Besides conventional adhesive bonding, there are several ways in which the fusion bonding process could be adapted to join the above mentioned panels to either themselves, or to other components to form bonded assemblies. For example, a fusion bonded panel may be trimmed or assembled so that an area around the periphery of the panel leaves the core exposed. This would allow for locally joining the panel to the mating part, by local heating of either part prior to them being compressed together (fusion bonded) as described above.

Several processes are currently under development in the automotive arena to use 'heat' formed pressed aluminium sheet in structures. Additional elongation may be achieved by heating carefully selected alloys just prior to forming/pressing, thereby allowing increased depth of draw and improved formability. Whilst at temperature, foam cores could be fixed to the panels via fusion bonding as described above. Alternatively skins could be placed either side of the core prior to heating and thermoforming the whole assembly, whilst at the same time using the heat to fusion bond the panels to the core.

Another variation on this process would be 'twin sheet thermoforming', but with a fusion bonded foam core. In twin sheet thermoforming, two flat skins are placed in a female/female tool which is then heated (or preheated), thereby softening the skins. Pressurised air is then applied between the skins, blowing each into its own female mould. The invention would be then to open the heated moulds (whilst keeping skins in place, possibly with a vacuum), introducing a thermoplastic foam core (which could be pre-formed depending on shape complexity), then closing the moulds. The retained heat in the skins can then be used to fusion bond them to the inserted core as described above. The mould temperature could if required be altered to a suitable fusion bonding temperature just prior to the foam being placed.

Figure 9:
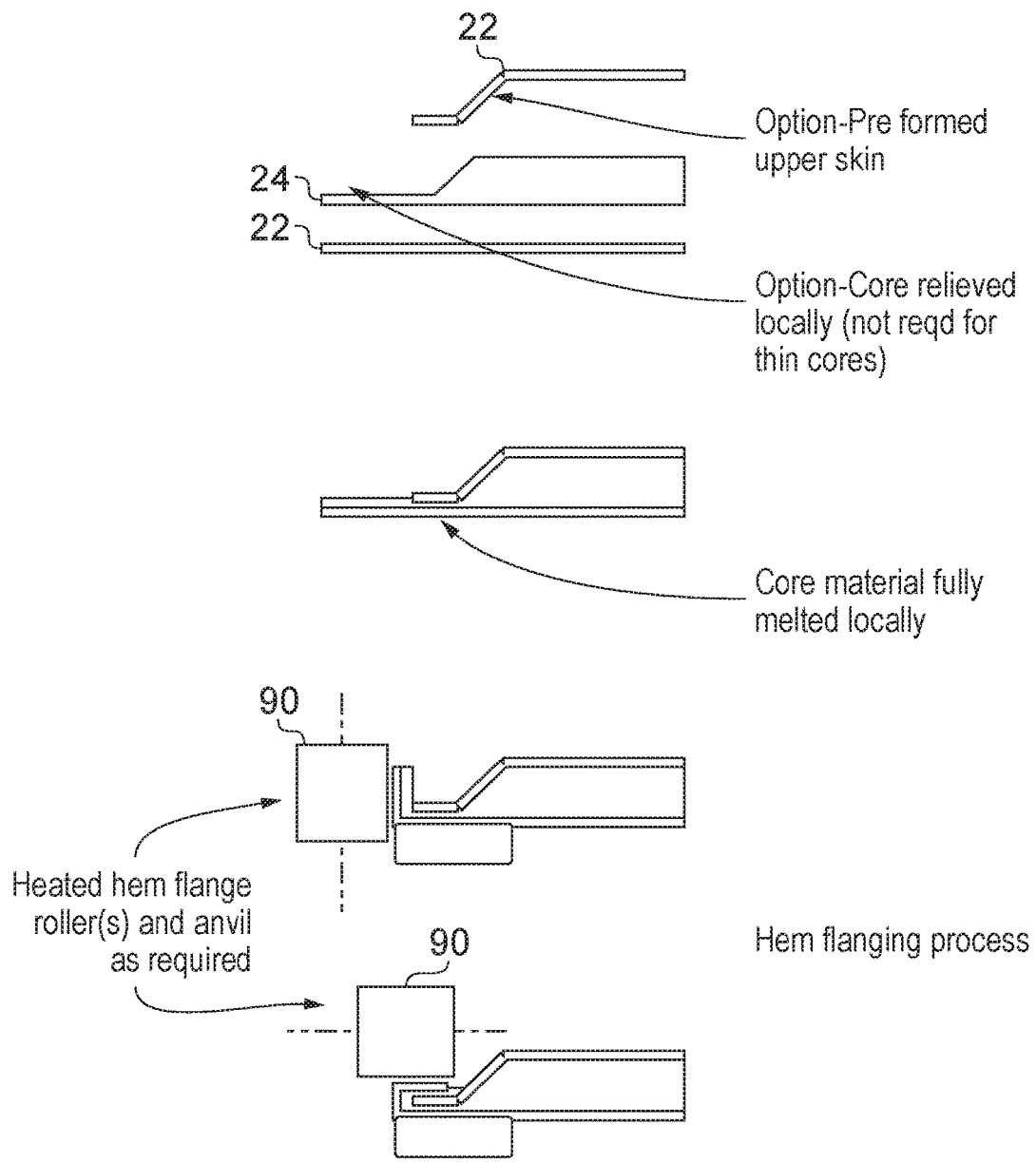
FIG. 9 shows an example of forming a hem flange of the sandwich panel.

FIG. 9 shows an example of forming a hem flange on a sandwich panel. This can be performed after bonding the skins 22 to the core 24 using the techniques described above. One skin layer 22 may be shorter than the other so that a part of the core 24 and other skin 22 may extend beyond the end of the shorter skin layer 22. When bonded, the core may be fully melted locally to fuse the skins to the core. During the heating, as the panel cools or at a subsequent stage, a heated tool 90 such as a set of rollers or an anvil may then form the end of the sandwich panel into a hem flange in which the lower skin 22 is folded up and around the upper skin to produce a sealed end. As the thermoplastic foam core cools it solidifies and retain the flange shape.

Figure 10:
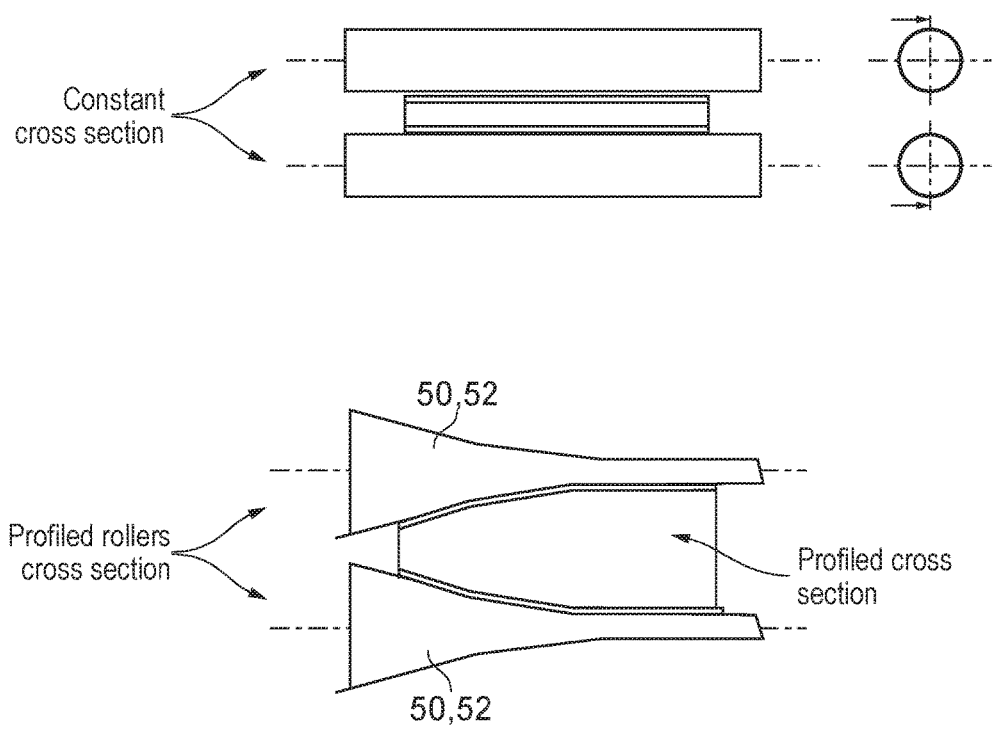
FIG. 10 shows an example of using profiled rollers to generate a sandwich panel with a shaped cross section.

FIG. 10 shows an example of manufacturing a sandwich panel with a non-constant cross section, so that the thickness of the panel varies across the width of the panel. By using heating or cooling rollers 50, 52 with a shaped profile as shown in the example at the bottom of FIG. 10, the panel can be generated with a profiled cross section, such as a tapered shape in this example. A wide variety of shapes are possible by selecting different shapes of rollers.

The manufacturing process discussed above has been simulated using a multi-physics computer model to provide thermal profiles and assessment of melt depth along the panel skins with time. The models can be used to optimise various parameters of the manufacturing process, such as the temperature of the heating rollers, temperature of the cooling rollers, the foam thickness, the skin thickness, the nip spacing between the heating rollers, the nip spacing between the cooling rollers, the number of pairs of heating rollers or cooling rollers, the feed rate of the structure through the roller assembly, etc. Both the computer model and real-life testing have shown very good results.

FIG. 11 is a table showing the properties of two example sandwich panels 20 with different skin thicknesses, as measured in the computer model, with the bending mode frequencies being obtained using a separate Finite Element Analysis model. The table compares the panels 20 made using the present technique with conventional pressed aluminium panels (without any core material) and the composite panels 10 of the type shown in FIG. 1 in which an epoxy adhesive glues the skins to the honeycomb core.

As shown in FIG. 11, the panels 20 of the present technique are much cheaper to manufacture than the adhesively bonded panels 10. The panels 20 have a significantly higher first bending mode frequency than existing panels (so can provide much better noise damping), and have comparable or improved flexural rigidity depending on the skin thickness chosen (so provide good strength and impact resistance). The thermal insulation is better than for pressed aluminium panels, and thermal mass lower. Unlike the adhesively bonded composite panels 10, the panels 20 are recyclable.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method of manufacturing at least one vehicle or building structural panel for a vehicle or a building, the method comprising:

forming a layered structure by layering a thermoplastic foam layer and at least one skin layer, wherein the thermoplastic foam layer and the at least one skin layer are at room temperature when forming the layered structure, and the at least one skin layer is more rigid than the thermoplastic foam layer;

conveying the layered structure through a roller assembly comprising at least one pair of heating rollers and at least one pair of cooling rollers, wherein the cooling rollers are at a lower temperature than the heating rollers;

heating the skin layer and applying a bonding pressure to the layered structure using said at least one pair of heating rollers, to melt at least part of the thermoplastic foam layer adjacent to the skin layer to bond the thermoplastic foam layer to the skin layer; and cooling the layered structure using said at least one pair of cooling rollers.

2. The method of claim 1, wherein the at least one skin layer and thermoplastic foam layer remain unheated until they arrive at the at least one pair of heating rollers.

3. The method of claim 1, wherein the layered structure is conveyed through the roller assembly by at least one belt.

4. The method of claim 3, wherein the at least one belt is heated when conveying the layered structure through said at least one pair of heated rollers and cooled when conveying the layered structure through said at least one pair of cooling rollers.

5. The method of claim 1, wherein the layered structure is supported directly by the roller assembly and conveyed through the roller assembly by rotation of the rollers.

6. The method of claim 1, wherein the bonding pressure is controlled by adjusting a nip spacing between at least one pair of heating rollers.

7. The method of claim 6, comprising a plurality of pairs of said heating rollers, wherein the nip spacing between each pair of heating rollers narrows as the layered structure is conveyed through the roller assembly.

8. The method of claim 1, comprising varying at least one of the depth and the density of said at least part of the thermoplastic foam layer by varying at least one of a pressure applied by the heating rollers or the cooling rollers, the rate at which the layered structure is conveyed through the roller assembly and a temperature of the heating rollers or the cooling rollers.

9. The method of claim 1, wherein the vehicle or building structural panel is generated with the thermoplastic foam layer having a variable density across the thickness of the thermoplastic foam layer.

10. The method of claim 9, comprising compressing the layered structure to vary the density of at least part of the thermoplastic foam layer after the heating step.

11. The method of claim 9, wherein the layered structure is conveyed through the roller assembly in a plurality of passes while changing the temperature or bonding pressure of the heating rollers between different passes.

12. The method of claim 9, wherein the thermoplastic foam layer conveyed into the roller assembly comprises a plurality of pre-laminated sub-layers having different densities of thermoplastic foam.

13. The method of claim 1, comprising compressing selected regions of the vehicle or building structural panel after bonding the at least one skin layer to the thermoplastic foam layer, to increase the density of the thermoplastic foam layer in the selected regions compared to other regions of the thermoplastic foam layer.

14. The method of claim 1, wherein the roller assembly is configured to form the vehicle or building structural panel into a predetermined shape.

15. The method of claim 14, wherein the predetermined shape comprises a curved shape.

16. The method of claim 14, wherein the predetermined shape has a non-constant cross-section.

17. The method of claim 1, comprising forming a flange portion at an end of the sandwich panel.

18. The method of claim 1, wherein the layered structure comprises a reinforcement layer between the at least one skin layer and the thermoplastic foam layer, and in the heating step the molten part of the thermoplastic foam layer infuses the reinforcement layer to bond the at least one skin layer to the reinforcement layer and the thermoplastic foam layer.

19. A method of manufacturing at least one structural panel for an engineering structure, the method comprising:
conveying a layered structure through a roller assembly comprising at least one pair of heating rollers and at least one pair of cooling rollers, wherein the cooling rollers are at a lower temperature than the heating rollers, the layered structure comprising a thermoplastic foam layer and at least one skin layer;
heating the skin layer and applying a bonding pressure to the layered structure using said at least one pair of heating rollers, to melt at least part of the thermoplastic foam layer adjacent to the skin layer to bond the thermoplastic foam layer to the skin layer; and
cooling the layered structure using said at least one pair of cooling rollers, wherein
the structural panel is generated with the thermoplastic foam layer having a variable density across the thickness of the thermoplastic foam layer, and
the layered structure is conveyed through the roller assembly in a plurality of passes while changing the temperature or bonding pressure of the heating rollers between different passes.

* * * * *